Aug. 1, 1939.    M. D. CARLETON    2,168,192

ROLLER BIT

Filed Nov. 4, 1938

Michael D. Carleton
Inventor

J. Vincent Martin
Ralph R. Browning
Attorney

Patented Aug. 1, 1939

2,168,192

UNITED STATES PATENT OFFICE 2,168,192

ROLLER BIT

Michael D. Carleton, Houston, Tex., assignor to Reed Roller Bit Company, Houston, Tex., a corporation of Texas Application November 4, 1938, Serial No. 238,710

7 Claims. (Cl. 255—71)

This invention relates generally to drilling bits and specifically to roller bits for the drilling of wells.

It has for its specific object the provision of a new and improved cross roller assembly and bearings therefor.

Other objects will hereinafter appear.

The preferred embodiment of the invention is illustrated by the accompanying drawing wherein.

Figure 1:
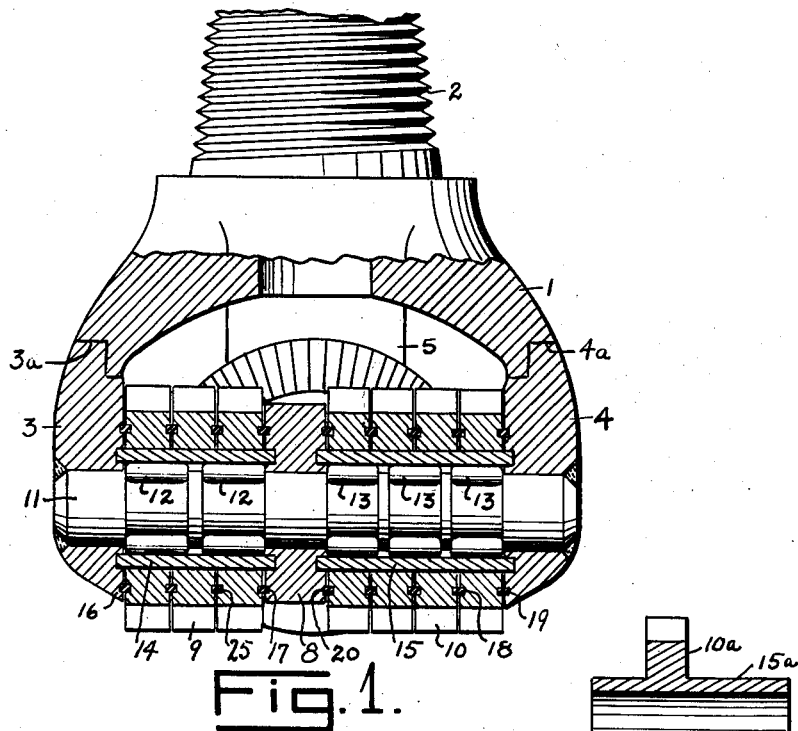
Fig. 1 is a sectional elevation of the bit.

In the drawing, the bit head is indicated at 1. It has on its upper end a screw threaded shank 2 for connection with the conventional drill stem, not shown. The head has four depending bearing projections to support the cutter assembly, the oppositely disposed bearing projections for the cross roller assembly being indicated by the numerals 3 and 4 and one of the oppositely disposed bearing projections for the side roller cutters being indicated by the numeral 5.

The side roller cutters are indicated by the numerals 6 and 7 of the two groups of the cross roller cutters on opposite sides of the bridge 8, by the numerals 9 and 10.

The general construction of bits of this type is well known and is illustrated by such patents as the patent to Stancliff 1,998,793 and the patent to Harrington 2,056,320. To permit the assembly of the bearings hereinafter described, the bearing projections may be made separate from the head and welded to the head as indicated at 3—A and 4—A in a manner well known to those skilled in the art.

Referring now to the new and improved cross roller assembly provided by this invention, it will be noted that on the cross roller pin 11 on each side of the bridge 8 are roller bearings 12 and 13 fitting in grooves in the cross roller pin 11; that upon the roller bearings 12 is a bushing 14 extending into the projection 3 and into the bridge 8; and upon the roller bearings 13 is a bushing 15 extending into the projection 4 and bridge 8. Upon the bushing 14 are a plurality of cross roller cutters 9 revoluble independently of each other; and upon the bushing 15 are a plurality of cross roller cutters 10 revoluble independently of each other. Between the cutters 9 are sealing rings 25; between the projection 3 and the adjacent cutter, a sealing ring 16; between the bridge 8 and the adjacent cutter a sealing ring 17; between the cutters 10 are sealing rings 18; between the projection 4 and the adjacent cutter, a sealing ring 19; and between the bridge and the adjacent cutter a sealing ring 20.

Figure 3:
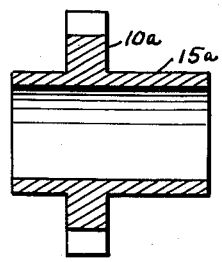
Fig. 3 is a detailed view illustrating the connection of one of the cross roller cutters to the bushing.
Figure 2:
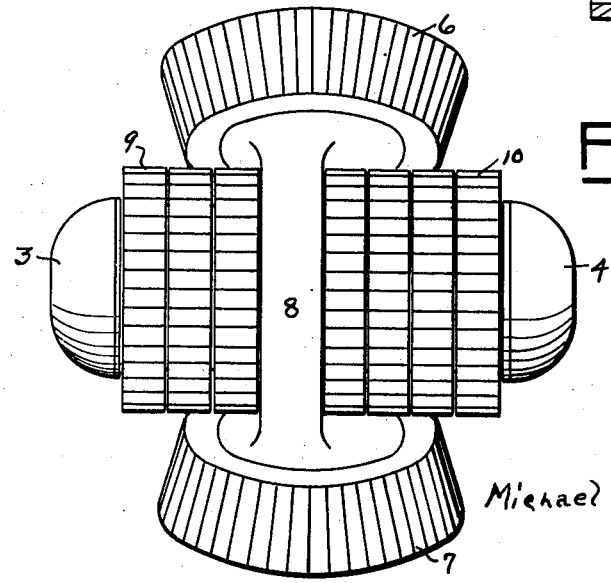
Fig. 2 is a bottom plan view.

In Fig. 3 the bushing 15—A and the cutter 10—A are made integral so that the latter will effect rotation of the former. It will be understood that for this purpose any of the cutters 10 may be made integral with the bushing 15, and any of the cutters 9 may be made integral with the bushing 14.

While the invention will be found particularly useful in cross roller cutter assemblies, it will be apparent to those skilled in the art that it may be utilized in other bits.

The bushings 14 and 15 will serve to exclude from the roller bearings 12 and 13 the abrasive fluid and foreign matter. The roller cutters 9 and 10 are free to rotate independently of each other, and the bushings 14 and 15 are free to rotate on the roller bearings 12 and 13. To insure rotation of the bushings, one of the cutters may be made integral therewith, or otherwise connected thereto, as shown by Fig. 3. The sealing rings 15, 16, 17, 18, 19 and 20 will serve to prevent the entrance of abrasive fluid or other foreign matter between the cutters and between the cutters and bushings.

The operations and various advantages of this invention in cross roller bits and other bits will be apparent to those skilled in the art.

I claim:

1. In a roller bit, a head having a pair of oppositely disposed depending bearing projections; a bridge between said projections; a pin extending from said bridge in opposite directions to said projections; rolling bearings on said pin; a bushing on said bearings on each side of said bridge and extending into said bridge and the adjacent projection; a group of roller cutters on each of said bushings, said cutters being revoluble independently of each other; sealing rings between said cutters and between said projections and bridge and the cutters adjacent thereto; one of each group of said cutters being connected to its bushing for rotation therewith.

2. In a roller bit, a head having a pair of oppositely disposed depending bearing projections; a bridge between said projections; a pin extending from said bridge in opposite directions to said projections; rolling bearings on said pins; a bushing on said bearings on each side of said bridge and extending into said bridge and the adjacent projection; a group of roller cutters on each of said bushings, said cutters being revoluble independently of each other; sealing rings between said cutters and between said projections and bridge and the cutters adjacent thereto.

3. In a roller bit, a head having a pair of oppositely disposed depending bearing projections; a bridge between said projections; a pin extending from said bridge in opposite directions to said projections; rolling bearings on said pin; a bushing on said bearings on each side of said bridge and extending into said bridge and the adjacent projection; and a group of roller cutters on each of said bushings, said cutters being revoluble independently of each other.

4. In a roller bit, a head having a pair of oppositely disposed depending bearing projections; a bridge between said projections; a pin extending from said bridge in opposite directions to said projections; rolling bearings on said pin; a bushing on said bearings on each side of said bridge and extending into said bridge and the adjacent projection; and a group of roller cutters on each of said bushings, said cutters being revoluble independently of each other; one of each group of said cutters being connected to its bushing for rotation therewith.

5. In a roller bit, a head having a pair of oppositely disposed depending bearing projections; a bridge between said projections; a pin extending from said bridge in opposite directions to said projections; rolling bearings on said pin; a bushing on said bearings on each side of said bridge and extending from said bridge to the adjacent projections; and a group of roller cutters on each of said bushings, said cutters being revoluble independently of each other.

6. In a roller bit, the combination of a pin; rolling bearings on said pin; a bushing on said rolling bearings; and a plurality of roller cutters on said bushing, said cutters being revoluble independently of each other, and one of said cutters being connected to said bushing for rotation therewith.

7. In a roller bit, the combination of a pin; rolling bearings on said pin; a bushing on said rolling bearings; and a plurality of roller cutters on said bushing, said cutters being revoluble independently of each other.

MICHAEL D. CARLETON.